United States Patent
Dyke et al.

(10) Patent No.: US 6,351,582 B1
(45) Date of Patent: Feb. 26, 2002

(54) PASSIVE OPTICAL NETWORK ARRANGEMENT

(75) Inventors: Peter John Dyke, Saffron Walden; Michael Philip Dyer, Stansted, both of (GB)

(73) Assignee: Nortel Networks Limited, Laurent (CA)

( * ) Notice: Subject to any disclaimer, the term of this patent is extended or adjusted under 35 U.S.C. 154(b) by 0 days.

(21) Appl. No.: 09/437,064

(22) Filed: Nov. 9, 1999

Related U.S. Application Data

(63) Continuation-in-part of application No. 09/295,946, filed on Apr. 21, 1999.

(51) Int. Cl.⁷ ................................ G02B 6/28
(52) U.S. Cl. .................. 385/24; 359/127; 359/152; 359/168; 359/173
(58) Field of Search ................. 359/127, 152, 359/168, 173; 385/24

(56) References Cited

U.S. PATENT DOCUMENTS

| | | | | |
|---|---|---|---|---|
| 5,608,720 A | * | 3/1997 | Biegel et al. | |
| 5,717,795 A | * | 2/1998 | Sharma et al. | |
| 5,778,116 A | * | 7/1998 | Tomich | |
| 5,796,501 A | * | 8/1998 | Sotom et al. | |
| 5,864,413 A | * | 1/1999 | Feldman et al. | |
| 5,886,801 A | * | 3/1999 | Van Deventer | |

* cited by examiner

Primary Examiner—Hung N. Ngo
(74) Attorney, Agent, or Firm—Lee, Mann, Smith, McWiliams, Sweeney & Ohlson

(57) ABSTRACT

A passive optical network having a plurality of optical splitters/combiners each comprising first and second through ports and at least one drop port. The through ports of the plurality of splitters/combiners are concatenated to form a linear arrangement having two end through ports. Optical signals may be transmitted between the end through ports by means of the linear arrangement; and signals may be transmitted between at least one of the end through ports and one of the drop ports by means of the linear arrangement. The splitter/combiners can be inserted to form drop points in a ring or dual-homed passive optical network to provide flexibility in provision of protection and network reconfiguration.

25 Claims, 7 Drawing Sheets

PASSIVE OPTICAL NETWORK ARRANGEMENT

This Appln is C.I.P. of Ser. No. 09/295,946 filed Apr. 21, 1999.

FIELD OF THE INVENTION

The present invention relates to passive optical networks, and in particular to a method and apparatus for providing flexibility in the protection afforded by such networks.

BACKGROUND TO THE INVENTION

Passive optical networks (PON) are known to be effective for distributing broadband and cable TV services directly to customers using optical fibre. Current passive optical network systems can offer full protection down to the customer but require complete duplication of (a) the fibre feeder from the exchange, (b) the splitter/combiners, (c) the customer drops, and (d) the electro-optical transceivers.

PON feeder protection alone requires duplication of every fibre down to every drop splitter. This doubles the fibre feeder requirements, with consequent potential duct congestion and excessive costs, and is especially expensive for long thin routes where duct space is also generally scarce.

There is at present therefore a strong demand from network operators to reduce the costs of fibre deployment to smaller customer sites (e.g. small businesses) and to the home. Equally, the standards for a are becoming more concerned with PON protection, as are many telecommunications manufacturers.

SDH/SONET rings are good for supporting larger businesses, but become expensive when only a few E1/T1's are required, especially if the locations of the subscribers' drop points are scattered. To date, operators have accepted that SDH/SONET solutions are needed for larger customers, but as the market migrates towards smaller businesses and residential customers, cost pressures dictate that more pragmatic, lower cost PON-type solutions are required. This has so far not happened since PON systems could not provide the high levels of availability required at competitive prices. It is therefore important to find a solution to the provision of cheaper alternatives to the existing SDH/SONET networks, whilst providing the same protection flexibility, in order to satisfy the commercial demand.

OBJECT OF THE INVENTION

The invention seeks to provide an improved method and apparatus for providing protection in passive optical networks.

SUMMARY OF THE INVENTION

According to a first aspect of the present invention there is provided an optical splitter/combiner arrangement for a passive optical network comprising two through optical ports and at least one drop optical port, and wherein a first optical path is provided between said through ports and a second optical path is provided between one of said through ports and one of said drop optical ports.

In one preferred embodiment, losses associated with said first optical path are lower than losses associated with said second optical path.

In a further preferred embodiment, a relatively high loss path is provided between one of said through ports and each of said drop ports.

In a further preferred embodiment, wherein a relatively high loss path is provided between each of said through ports and one of said drop ports.

In a further preferred embodiment, wherein a relatively high loss path is provided between each of said through ports and each of said drop ports.

In a further preferred embodiment, arranged to split signals received on one of said drop ports between each of said through ports.

In a further preferred embodiment, the optical splitter/combiner arrangement comprises first and second asymmetrical splitter/combiners optically connected to each other to form a low loss optical path and each optically connected to a common one of said through ports, and each optically connected to a third splitter/combiner optically connected to said at least one drop port.

In a further preferred embodiment, the optical splitter/combiner arrangement comprises an asymmetrical splitter/combiner optically connected to each of said through ports and providing a low loss path between said ports, and each optically connected to a third splitter/combiner optically connected to said at least one drop ports to form a relatively higher loss path between said through ports and said drop ports.

In a further preferred embodiment, the optical splitter/combiner comprises only one optical splitter/combiner.

In a further preferred embodiment, the optical splitter/combiner arrangement comprises a WDM splitter/combiner.

According to a further aspect of the present invention there is provided a passive optical network comprising a splitter/combiner arrangement according to the first aspect.

In one preferred embodiment, each of said two through ports of said splitter/combiner arrangement is optically connected via a linear optical network to a distinct OLT transceiver.

In a further preferred embodiment, said splitter/combiner arrangement is arranged to convey signals between each of said distinct OLT transceivers and said at least one drop ports whereby to provide protection against single point failure in said linear network.

In a further preferred embodiment, said distinct OLT transceivers are physically separated whereby to provide dual homing.

Advantageously, the passive optical network may comprise a plurality of splitter/combiner arrangements wherein said splitter/combiner arrangements are configured to provide a plurality of distinct degrees of protection against faults in the network.

The invention also provides a passive optical network comprising a plurality of splitter/combiner arrangements according to the first aspect wherein said splitter/combiner arrangements are configured to provide a plurality of distinct degrees of protection against faults in the network.

There is also provided a passive optical network comprising: a plurality of optical splitters/combiners each comprising first and second through ports and at least one drop port; wherein said through ports of said plurality of splitters/combiners are concatenated to form a linear arrangement having two end through ports; whereby optical signals may be transmitted between said end through ports by means of said linear arrangement; and wherein signals may be transmitted between at least one of said end through ports and one of said drop ports by means of said linear arrangement.

There is also provided an optical splitter/combiner arrangement comprising: first, second and third optical ports; and at least one drop optical port; and wherein a relatively low loss path is provided between said first and second ports, a relatively high loss path is provided between said first optical port and said at least one drop optical ports, and a relatively high loss path is provided between said third optical port and said at least one drop optical port.

In one preferred embodiment, it additionally comprises: a fourth optical port; and wherein a relatively high loss path is provided between said second and fourth optical ports and a relatively high loss path is provided between said fourth port and said at least one drop optical ports.

Th invention also relates to a passive optical network comprising such a splitter/combiner arrangement.

In a further preferred embodiment, each of said first optical port of said splitter/combiner arrangement is connected via a linear optical network to a first OLT transceiver, and said second and third optical ports of said splitter/combiner arrangement are each optically connected via a linear optical network to a second OLT transceiver.

In a further preferred embodiment, said splitter/combiner arrangement is arranged to convey signals between each of said first and second OLT transceivers and said at least one drop port whereby to provide protection against single point failure in said linear optical networks.

The invention also provides for a system for the purposes of digital signal processing which comprises one or more instances of apparatus embodying the present invention, together with other additional apparatus.

The invention is also directed to a method by which the described apparatus operates and including method steps for carrying out every function of the apparatus.

According to a further aspect of the present invention there is provided a method of adding a drop point to a PON comprising at least one drop point optically connected by a linear arrangement of fibre lines to first and second OLT transceivers, comprising the steps of: severing one of said fibre lines to expose two fibre ends; providing a drop point arrangement according to the first aspect; coupling said exposed fibre ends to said drop point arrangement.

In one preferred embodiment, the method is performed while the PON is carrying traffic.

According to a further aspect of the present invention there is provided a method of upgrading a PON comprising a plurality of drop points optically connected by a linear arrangement of fibre lines to first and second OLT transceivers, comprising the steps of: severing one of said fibre lines to expose two fibre ends; providing third and fourth OLT transceivers; providing optical fibre lines; coupling said exposed fibre ends via said optical fibre lines to said third and fourth OLT transceivers.

In one preferred embodiment, the method is performed while the PON is carrying traffic.

According to a further aspect of the present invention there is provided a method of providing a PON comprising: providing a pair of transceivers, providing a plurality of optical fibre lengths; providing at least one splitter/combiner drop point arrangement; connecting said fibre lengths and said splitter/combiner drop point arrangement to form a linear network connecting said at least one splitter/combiner drop point arrangement and connecting said transceivers to opposite ends of said linear network; and wherein one transmitter and one receiver of said pair of transceivers operates in main mode and another transmitter and another receiver of said pair of transceivers operates in warm standby mode; and arranged to provide single point failure protection in the network between said transceivers.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
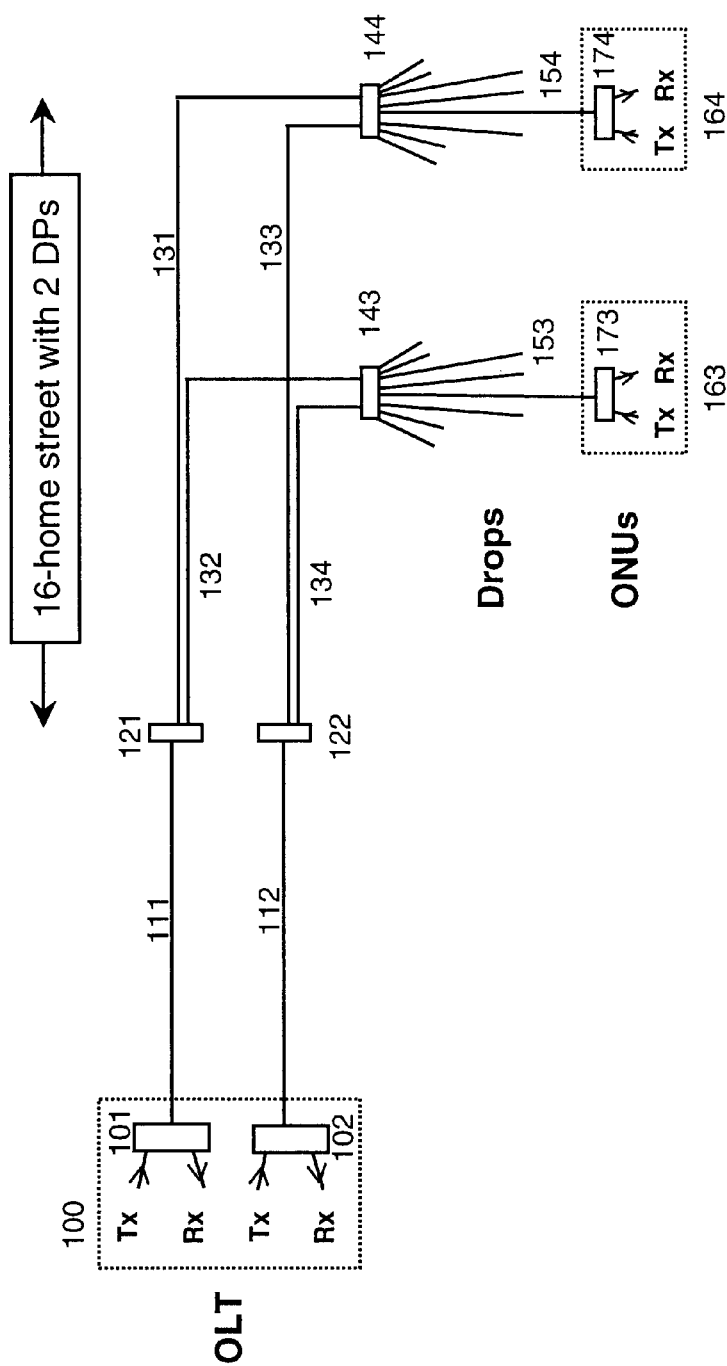
FIG. 1 shows an example of a PON arrangement in accordance with the prior art.

FIG. 1 shows, for comparison purposes, a protected PON according to the prior art arranged for distributing signals between an Optical Line Terminal (OLT) 100 and multiple Optical Network Units (ONU's) 163, 164. Specifically the arrangement comprises an OLT 100 comprising first and second optical transceivers 101, 102 connected via fibre feeder lines 111, 112 to initial distribution splitter/combiners 121, 122 respectively. Each of the initial distribution splitter/combiner is connected by means of fibre distribution lines 131–134 to each of two drop points each comprising an optical splitter/combiner 143, 144 respectively. The drop point splitter/combiners 143, 144 are each connected via final drop distribution lines 153, 154 to subscriber ONUs (of which two are illustrated 163, 164). Each optical splitter/combiner is shown with eight associated final drop distribution lines, though only one ONU is shown per optical splitter.

For the arrangement shown, losses in each of the initial splitter/combiners would be in the order of 3 dB and losses in the final drop splitter/combiners in the order of 9 dB. The overall transmission power loss between the OLT and each ONU, caused by the splitter/combiners, would be approximately 12 dB.

In this arrangement transceiver 101 acts as the main transceiver whilst transceiver 102 acts in warm standby mode to provide protection against faults in the system between the main transceiver 101 and the drop point splitter/combiners 143, 144 by virtue of duplication of the feeder and distribution network. In normal operation, transmissions from each ONU are combined by optical splitter/combiners 143, 144 and directed to each transceiver in the OLT, whilst transmissions from the OLT originate solely from the main transceiver and are directed to each ONU via initial distribution splitter/combiners 121, 122 and final drop splitter/combiners 143, 144 respectively. When a fault is detected in the transmission path between the main transceiver and an ONU, the warm standby transceiver 102 is brought into active operation. This protects against single faults in the arrangement anywhere between the OLT transceivers and the final drop splitter/combiners (and including faults in the OLT transceivers themselves).

In practice a typical physical embodiment of such a system would be that the main and warm standby feeders lines 111, 121 would extend from the OLT to initial splitter/combiners 121, 122 located at one end of a street. From there the distribution fibre lines 131–134 run to drop points located along the length of the street. In the example shown, taking the distance from each initial splitter/combiner to the final distribution splitter/combiner of its physically closest drop point to be one unit length, and taking the distance between successive drop points to be similarly of one unit length, then 6 fibre lengths are required to provide the protected distribution network from initial splitter/combiners to the final distribution splitter/combiners of the two drop points.

Figure 2:
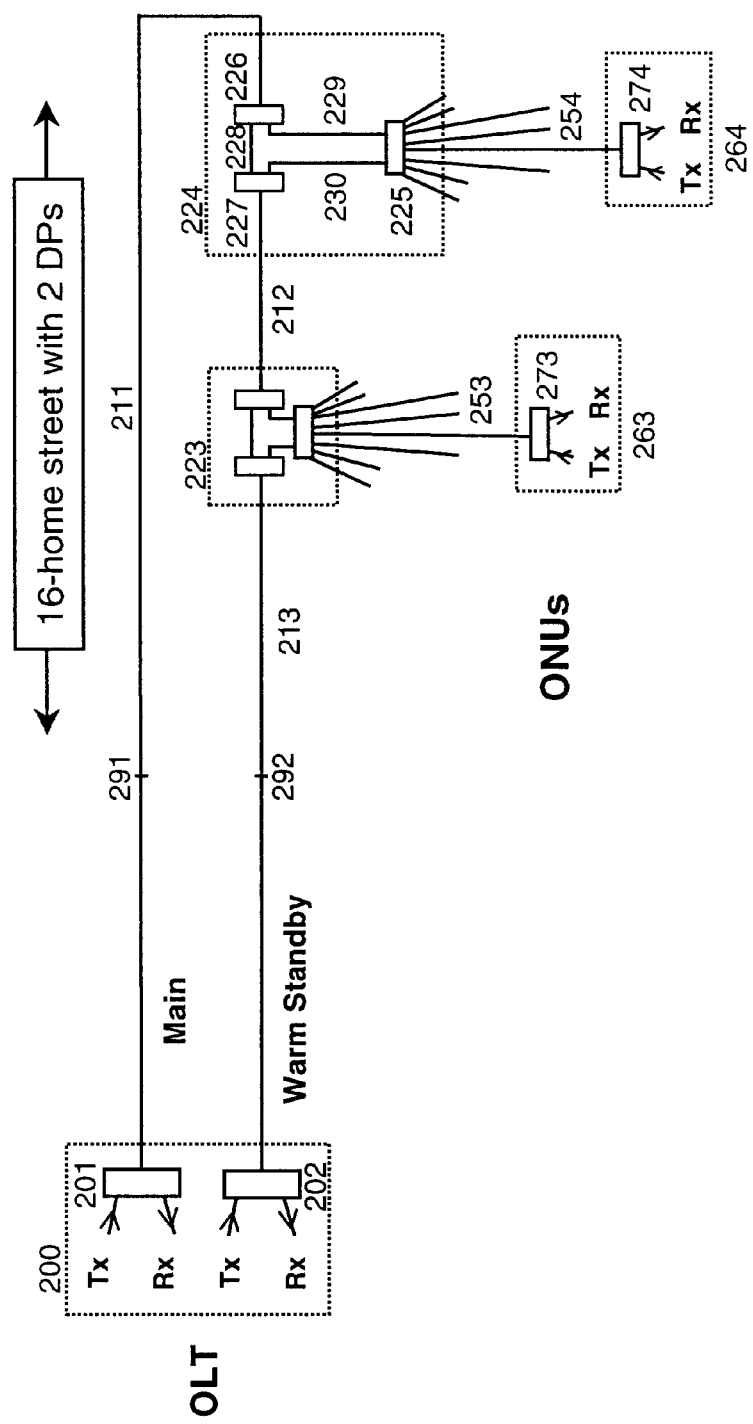
FIG. 2 shows an example of a PON in accordance with the present invention.

Turning now to FIG. 2 a ring-protected PON arrangement is shown arranged to serve the same number and configuration of subscribers. This arrangement comprises one OLT 200 comprising two transceivers 201, 202 one of which 201 is arranged to operate in main mode, whilst the other 202 is arrange to operate in warm standby mode. The distribution network in this case comprises two drop point arrangements 223, 224 connected by fibre distribution lines 211–213 to form a ring between the transceivers 201, 202. Each drop point arrangement 223, 224 is linked to a number of subscriber ONUs 263, 264 each comprising optical transceivers 273, 274 respectively by means of a fan-out arrangement of final drop fibre links 253, 254 respectively similar to the arrangement shown in FIG. 1.

Each drop point arrangement 223, 244 comprises an arrangement of three optical splitter/combiners: two ring splitter/combiners 226, 227, and one final drop splitter/combiner 225.

Considering firstly transmissions from the OLT to ONU 264, the signals transmitted from main transceiver 201 over the fibre distribution network 211 to the first ring splitter/combiner 226 of the first drop point 224. Ring splitter/combiner 226 is arranged such that the majority of the signal received is conveyed via optical medium 228 to the second ring splitter/combiner 227 from which it is transferred via fibre 212 to the second drop point 223 where a similar procedure takes place. A small proportion of the signal received at ring splitter/combiner 226 is conveyed via optical medium 229 to final drop splitter/combiner 225 which again divides the signal, in this case typically equally, between the final drop lines 254 to the subscriber ONUs 264.

Considering now traffic in the reverse direction from ONU to OLT, transceiver 274 emits a signal which is conveyed via the final drop feeder lines 254 to splitter/combiner 225 of the drop point arrangement which splits the signal, typically equally, and conveys the resulting signals by means of optical media 229, 230 to splitter/combiners 226 and 227 respectively. The signal so conveyed to splitter/combiner 226 is then conveyed via feeder cable 211 to the main transceiver 201 whilst the signal so conveyed to splitter/combiner 227 is conveyed via the distribution network comprising feeder line 212, drop point arrangement 223, and feeder line 213 to the standby transceiver 202.

Whilst the arrangement has been described in terms of distinct splitter/combiners and connected media, the arrangement may alternatively be implemented as a single integrated component, for example as a silicon planar waveguide.

In normal operation only the main transceiver 201 is used to transmit and receive signals between the OLT and outlying ONUs.

In the event of a fault arising in the distribution network 211 or main transceiver 201 the warm standby transceiver 202 comes into operation to transmit to the ONUs and to process signals received from them. However no active change in operation mode is required in the network either in the splitter/combiner arrangements 223, 224 or in the subscriber ONUs since the splitter/combiner arrangements are such that the ONUs cannot distinguish between signals received from the main and the standby transceiver in the OLT; and conversely the splitter/combiner arrangements direct transmissions from the ONUs both to the main and standby transceivers in both modes of OLT operation.

In the event of fault arising in the network between splitter/combiner arrangements, for example in distribution line 212, then communication to and from some ONUs, for example 264, will continue to be with main transceiver 201 whilst communication with others, for example 263, will switch to the warm standby transceiver 202. This arrangement therefore provides single point failure protection both in the fibre distribution network (including the OLT transceivers) and in any one of the splitter/combiners 226, 227 directly connected to that network.

In an alternative configuration, the transmitter of transceiver 201 and receiver of transceiver 202 are used to support operation in normal operation, whilst the receiver of transceiver 201 and transmitter of transceiver 202 operate in warm standby.

Through losses in each of the ring splitter/combiners 226, 227, using known technology, would be typically in the order of 1 dB, drop losses typically 10 dB, and losses in the final drop splitter/combiner typically 9 dB. The overall transmission power loss between the OLT and each ONU would typically be in the order of 21 dB due to the high losses in the final drop splitter/combiner and in the series of ring splitter/combiners around the ring-protected PON through which the signals would pass. Whilst these optical losses are higher than in the conventional protected PON, they are nevertheless easily accommodated by the transceivers.

Whilst a similar wavelength may be used for transmission both to and from the OLT, in a preferred embodiment distinct wavelengths are used for communications in opposite directions: for example 1550 nm may be used for downlink transmission from OLT to ONU, with 1300 nm used for uplink transmission from ONUs to OLT. Using distinct wavelengths has the advantage of allowing a single fibre to pass the two directions of traffic easily, with minimum interference between them.

The arrangement of FIG. 2 has the advantage that addition of a new drop point within the network may be achieved simply by cutting a distribution line, for example 213, at an convenient point and connecting a new splitter/combiner arrangement. This operation has the advantage of not requiring any additional fibre to be installed. Furthermore, the operation entails no disruption to the normal operation of the network from the subscribers' point of view since the cutting of the fibre is indistinguishable from a fault arising in the network and the in-built protection mechanisms come into play immediately to provide continuous service to the subscribers.

For comparison with the arrangement of FIG. 1, nominal points 291, 292 corresponding to the geographical limit of the feeder network of FIG. 1 are indicated. Assuming the same physical spacing of drop points (splitter/combiner arrangements) with respect to each other and with respect to the nominal limit of the feeder network, then the arrangement of FIG. 2 requires only 4 fibre lengths as opposed to 6 fibre lengths in the previous arrangement.

As the number of drop points in the network increases so the amount of saving of fibre also increases. For example, for a similar distribution network arranged to support a 16 home street with 4 drop points each serving 4 subscribers, a fully duplicated distribution network in the style of FIG. 1 would require 20 fibre lengths whilst a corresponding ring-protected PON arrangement similar to that of FIG. 2 would require only 8 fibre lengths.

The saving becomes even more pronounced when considering a distribution network to support a 32-home street with 8 drop points each serving 4 subscribers: fully duplicated distribution network would require 72 fibre lengths, whilst a corresponding ring-protected PON in the style of FIG. 2 would require only 16 fibre lengths (a quarter of the fibre required for the fully duplicated distribution network).

In one preferred embodiment, the main and standby transceivers 101, 102 are located at distinct physical locations (for example opposite ends of the same street) whereby to provide protection through dual homing.

Figure 3:
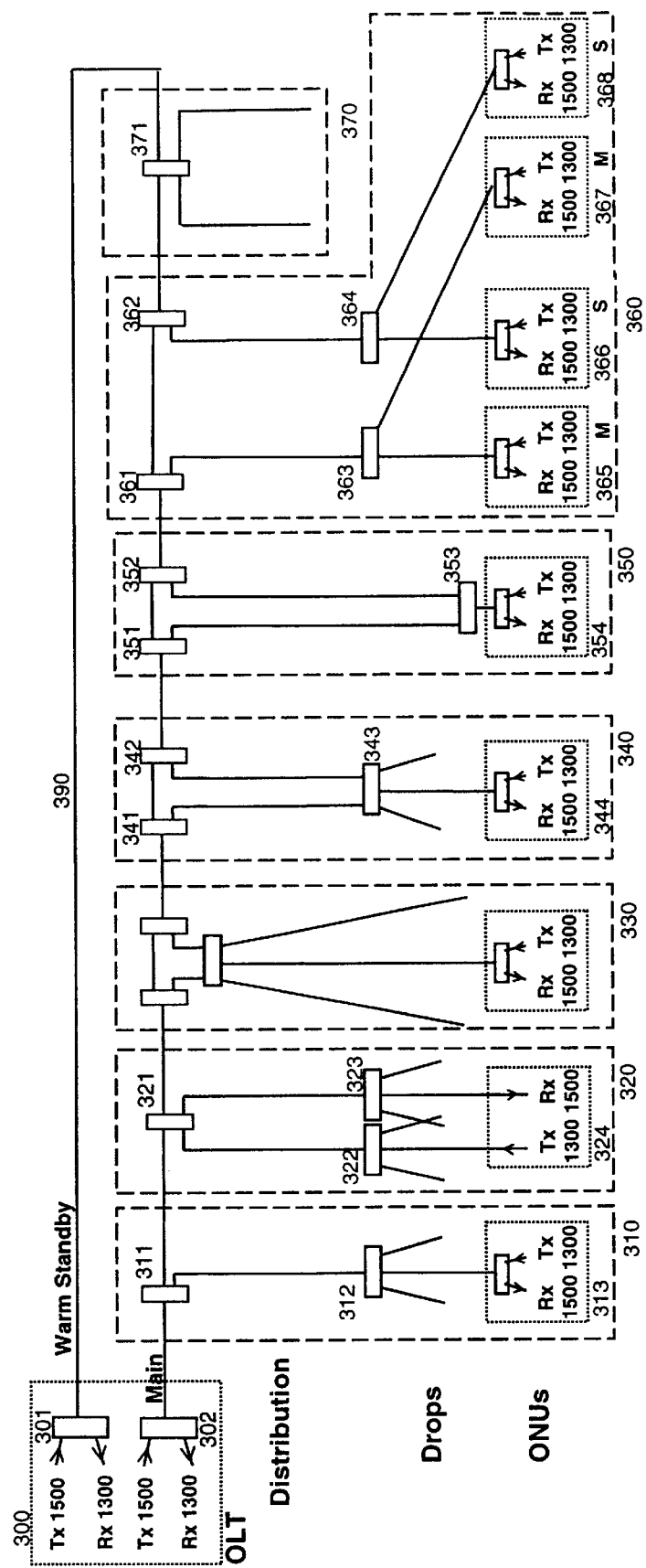
FIG. 3 shows a second example of a PON in accordance with the present invention.

Turning now to FIG. 3 there is shown a ring-protected PON arrangement for a network having a multiplicity of drop arrangements, each providing different levels of protection to each subscriber ONU. This arrangement comprises an OLT 300 connected via a fibre ring 390 to each of 6 drop point arrangements 310–360. The OLT comprises two transceivers 301, 302 each arranged to transmit on a first wavelength (for example 1500 nm) and to receive on a second wavelength (for example 1300 nm), one transceiver (for example 302) acting as main whilst the other (for example 301) acts as warm standby. The individual drop point arrangements are now addressed in turn.

The first arrangement 310 comprises a distribution splitter/combiner 311 connected to the distribution ring and connected via a separate fibre to the final drop splitter/combiner 312 which in turn connects to subscriber ONUs 313. The distribution splitter/combiner 311 is arranged such that transmissions from the main transceiver 302 are substantially passed through to following drop points 320–360 whilst a small proportion of received signal is split off and conveyed to the final drop splitter/combiner 312. Conversely transmissions from the ONU 313 are conveyed via final drop splitter/combiner 312 to the distribution splitter/combiner 311 where it is merged back into the fibre ring for onward transmission to transceiver 302. In this arrangement the distribution splitter/combiner 311 is not bidirectional in operation: only transmissions from the main transceiver 302 are conveyed to the ONU 313 and similarly transmissions from the ONU are conveyed only to main transceiver 302. The unidirectional nature of the splitter/combiner 311 means that there is no communication possible between ONU 313 and warm standby transceiver 301. This particular drop point arrangement therefore provides no protection against failure of the feeder ring 390.

Arrangement 320 comprises a drop point splitter/combiner 321 connected both to the fibre distribution network 390 (by means of two through ports on the splitter/combiner) and via two distinct fibres connected (by means of two drop ports on the splitter/combiner) to two final drop splitter/combiners 322, 323 respectively which are connected to the transmitter and receiver respectively on ONU 324. In this arrangement the majority of the signal from the transmitter 302 follows a through path around the fibre ring whilst a small proportion of signal from the main transmitter 302 of the OLT are directed to a first final drop point splitter/combiner 323 from which they are conveyed to the receiver of the ONU 324. Conversely transmissions from the ONU 324 are conveyed to a second final drop point splitter/combiner 322 from which they are conveyed to the distribution splitter/combiner 321 and merged into the distribution ring fibre 390 to be conveyed to the second transceiver 301 of the OLT. In this arrangement all traffic whether from OLT to ONU or vice versa is conveyed in the same direction round the distribution ring. For this arrangement OLT transceivers 301, 302 do not act as main or standby respectively: rather the transmitter of transceiver 302 and receiver of transceiver 301 act as main whilst the receiver of transceiver 302 and the transmitter of transceiver 301 act as one standby. This arrangement once again provides no protection against single point failures in the distribution ring.

Drop point arrangement 330 reiterates the arrangement described above and illustrated in FIG. 2.

Arrangement 340 is similar in its logical construction to that of arrangement 330 but serves to show the possibilities of providing additional protection by physically distributing the three splitter/combiners 341–343. In this arrangement by locating the final drop point splitter/combiner 343 at a distance from the fibre ring 390 and using optical fibre to provide the connections between the ring splitter/combiners 341 and 342 and final drop splitter/combiner 343, additional single point failure protection can be provided for that portion of the distance between the fibre feeder ring and the ONU at customer premises. In this arrangement protection is not provided between final drop splitter/combiner 343 and the subscriber ONU 344.

Arrangement 350 is similar in concept to that of 340 but differs in that the final drop splitter/combiner 353 is located in close proximity to the subscriber ONU 354 and is arranged to serve only ONU 354. Protection is therefore provided between the fibre ring splitter/combiners 351, 352 and the final drop splitter/combiner 353, effectively providing single point failure protection from OLT 300 right through to the subscriber premises.

Arrangement 360 shows a drop point arrangement providing full protection from OLT 300 right through to the subscriber premises, at which a master ONU 365 is protected by a slave ONU 366. The arrangement comprises two instances of the unprotected arrangement 310 described above. A first such arrangement comprising ring splitter/combiner 361, final drop splitter/combiner 363 and ONUs 365, 367 is arranged to support communication with the main transceiver 302 whilst the second arrangement comprising ring splitter/combiner 362, final drop splitter/combiner 364 and ONU transceiver 366, 368 is arranged to support communication with the warm standby transceiver 301. In this arrangement greater physical protection can be provided by a) physically distributing the two ring splitter/combiners 361 and 362 at separate locations on the fibre ring, b) dual routing the fibre connecting the ring splitter/combiners 361, 362 to the final drop splitter/combiners 363, 364; c) physically separating the final drop splitter/combiner 363, 364; and d) dual routing the final drop fibre links between the final drop splitter/combiners and the master and slave ONU transceivers 365, 367 and 366, 368.

Lastly, arrangement 370 shows an alternative drop point splitter/combiner arrangement for full protection and which may be used in place of the splitter/combiners 361, 362 of drop point arrangement 360. In this arrangement it may be necessary for the standby transmitter 301 to be switched off during normal operations.

As can be seen the ring arrangement can be used in conjunction with various drop point arrangements to provide differing levels of protection between OLT and ONUs. Some protection can be provided by duplication of the final drop between final drop splitter/combiner and ONU, or by feeding each of the duplicated drops to a distinct ONU. This provides additional protection against single faults between the OLT and ONUs in the distribution network up to levels where the complete network can be fully protected.

Allowing different types of protection to different customers as required, gives network operators significant advantages in being able to provide varying levels of Service Level Agreements (SLA) to their customers using a single ring-protected PON. For example, business customers may require a fully duplicated (feeder and distribution) connection, whereas residential customers located adjacent each other may only need a protected feeder ring 390.

Figure 4:
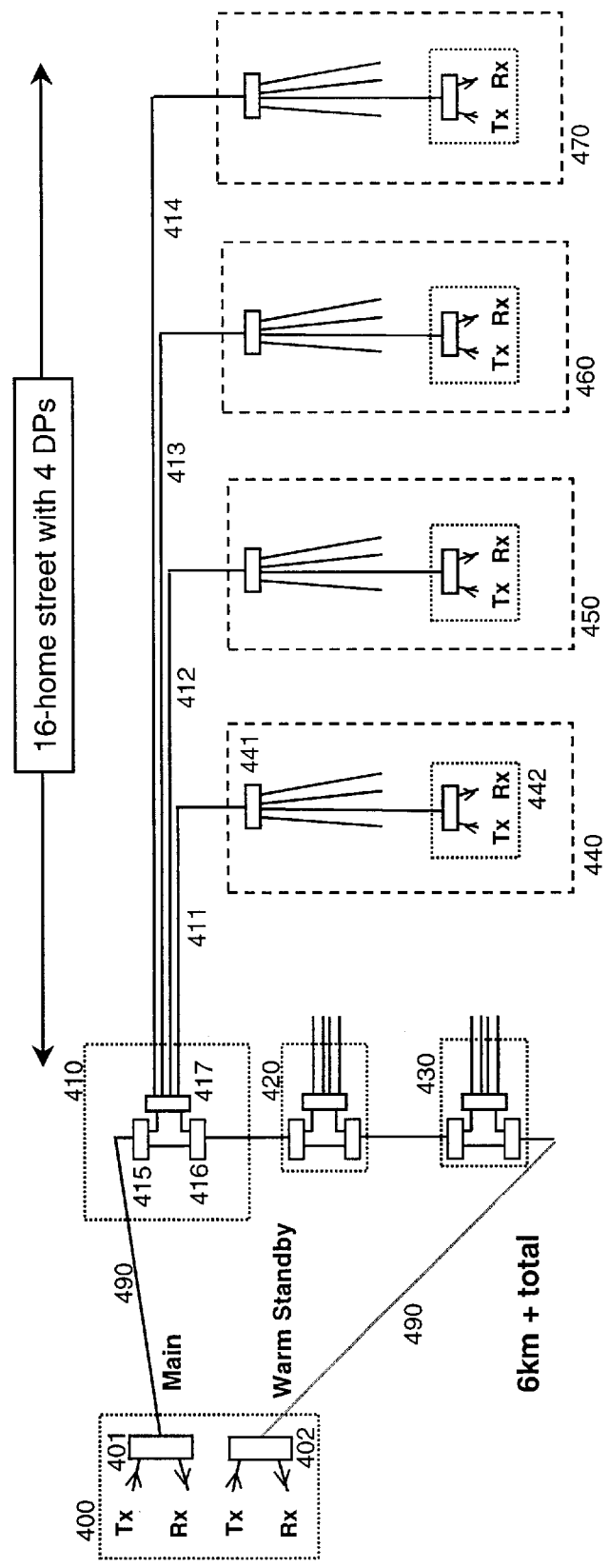
FIG. 4 shows a third example of a PON in accordance with the present invention.

Referring now to FIG. 4 there is shown an alternative arrangement in which the distribution from the drop points to ONUs is effected in two stages.

In a first stage a ring-protected feeder 490 serves three drop points, 410, 420, 430 from each of which a number of distribution lines 411–414 are connected to a final drop splitter/combiner 441 arranged to distribute signals to a multiplicity of ONUs 442.

In this arrangement the ring-protected PON may be used for example to provide protection between an OLT and multiple drop points arranged one per street, thereby providing protection for the inter-street portion of the distribution network.

In this arrangement the OLT 400 again comprises two transceivers 401, 402, first 401 acting as main whilst second 402 acts as one standby. Losses in ring splitter/combiners 415 and 416 are in the order of 1 dB for through-traffic continuing round the ring and 10 dB for signal split off for distribution. Typical loss in the initial distribution splitter/combiner 417 is in the order of 6 dB as is the typical loss in final drop splitter/combiner 441. The overall transmission power loss between OLT and each ONU in this instance would typically be in the order of 26 dB due to the combined effect of the high losses in the initial distribution splitter/combiners and final drop splitter/combiners.

In this arrangement the ring protected PON could typically be much longer than that of FIG. 2, for example of the order of 6 kilometres or more in total length. In this arrangement it is the feeder network which is protected by the ring protected PON. The specific drop point splitter/combiner arrangements 410, 420 and 430 may be physically distributed so that the initial drop splitter/combiner 417 is located closer to the final drop arrangements 440, 450, 460, 470 whereby to provide protection in the distribution network whilst reducing the total amount of fibre required.

Figure 5:
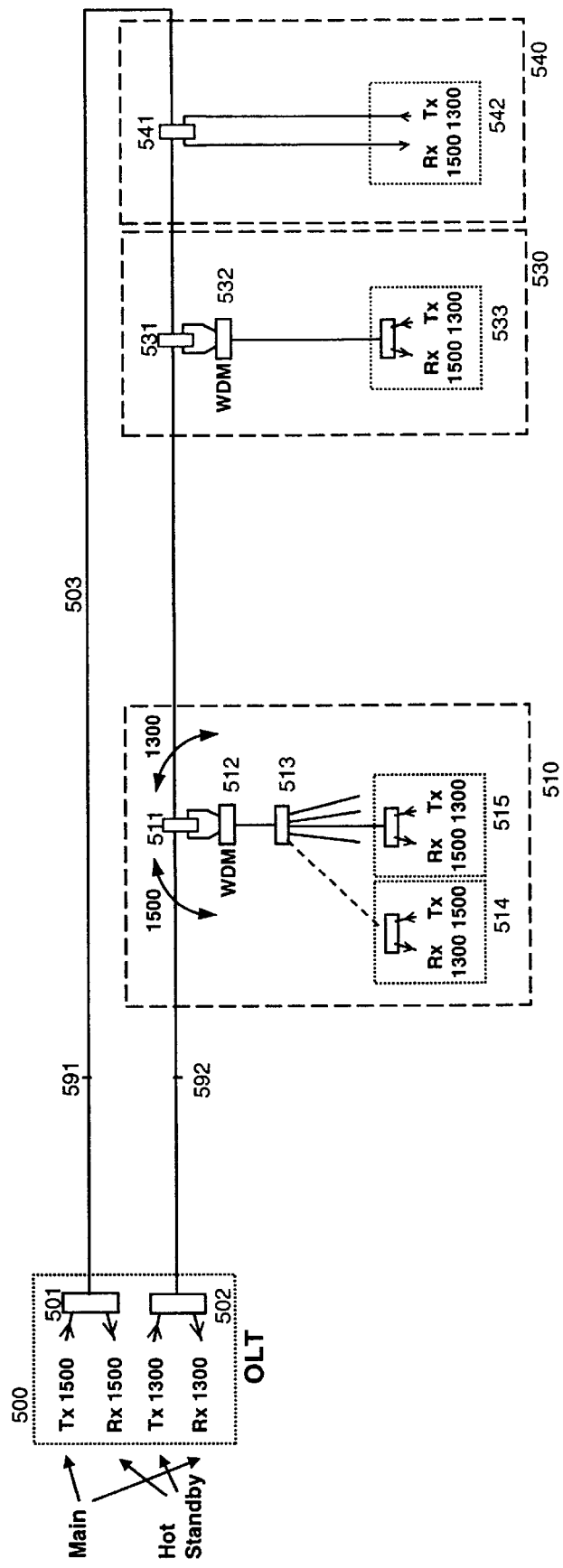
FIG. 5 shows a fourth example of a PON in accordance with the present invention.

Turning now to FIG. 5 there is shown a further embodiment of the present invention comprising an OLT 500 serving a fibre feeder ring 503 connected in series to three drop point arrangements 510, 530, 540. The OLT again comprises two transceivers 501, 502, where in this case transceiver 502 transmits and receives on a first wavelength (e.g. approximately 1550 nm) whilst transceiver 502 transmits and receives on a second wavelength (e.g. 1300 nm) chosen from the set of appropriate optical wavelength windows (including for example 850 nm, 1300 nm, and 1500 nm). Transceiver 501 acts as main transmitter and one standby receiver whilst transceiver 502 acts as main receiver and standby transmitter. The drop point arrangements are now described in turn.

Arrangement 510 comprises a wavelength flat ring splitter/combiner 511 connected both to the fibre ring and by two separate optical connectors to a single wavelength division multiplexing (WDM) splitter/combiner 512. A single fibre connection provides the path from the WDM splitter/combiner 512 to the final drop splitter/combiner 513 connected in turn to the ONUs 514, 515. In this arrangement transmissions from the main transmitter 501 at 1550 nm are conveyed around the ring to the ring splitter/combiner 511 which conveys the majority of the signal with approximately 1 dB loss further around the ring, whilst splitting off a low power signal with a higher loss of approximately 10 dB to the WDM splitter/combiner 512. This low power signal is then conveyed as before to the ONU 515 arranged in this case to receive signals on 1500 nm. In the reverse direction, transmissions at 1300 nm from the ONU are conveyed via final drop splitter/combiner 513 to the WDM splitter/combiner 512 which directs these signals via the second optical connection (through port) to ring splitter/combiner 511 and thence on to the ring, directed towards the main receiver 502. Use of a WDM splitter/combiner in this arrangement ensures that all traffic received in a direction from the main transmitter 501 is directed towards the main receiver 502. Furthermore, the use of the WDM splitter/combiner 512 in conjunction with the two oppositely-directed paths from the WDM splitter/combiner to the ring splitter/combiner avoids interference problems which would otherwise arise from signals transmitted from the ONU arriving at the wavelength flat splitter/combiner 511 and being redirected back towards the originating ONU.

In an arrangement where a single transceiver 515 is provided per ONU, protection is not provided against single point failures in the distribution ring. This may be overcome by provisioning each ONU with a second transceiver 514 in which the allocation of wavelengths to receiver and transmitter are reversed with respect to those in transceiver 515 so that signals are received from the hot standby transmitter 502 and transmitted to the hot standby receiver 501.

This arrangement has the advantage over earlier drop point arrangements that only one splitter/combiner lies on the through path around the ring, thereby reducing cumulative losses as signals propagate around the ring. In this case through losses on the ring splitter/combiner are again around 1 dB, drop losses around 10 dB, and losses in the WDM splitter/combiner around 6 dB, giving overall losses for the path between OLT and ONUs in the order of 20 dB.

Turning now to arrangement 530 there is shown a simplified drop point arrangement comprising a wavelength flat ring splitter/combiner 531 connected both to the ring to form a through path, and in each direction to a WDM splitter/combiner 532. In this instance the WDM splitter/combiner 532 is directly connected by a fibre to ONU 533. Omission of a final drop splitter/combiner reduces the signal loss between the ring splitter/combiner 531 and ONU 533. In the arrangement shown protection is not afforded against single point failures in the distribution ring 503.

Arrangement 540 further simplifies the drop point arrangement which is reduced in this case to a single wavelength flat bidirectional ring splitter/combiner 541 connected to the ring and in one direction to the receiver of ONU 542 and in the other direction to the transmitter of that ONU. Transmitter and receiver are arranged to operate on distinct wavelengths so that signals received by the ring splitter/combiner 541 from ONU 542 do not cause significant problems when fed back via splitter/combiner 541 to the receiver of ONU 542. Once again this arrangement is not protected against single point failure in the ring.

Figure 6:
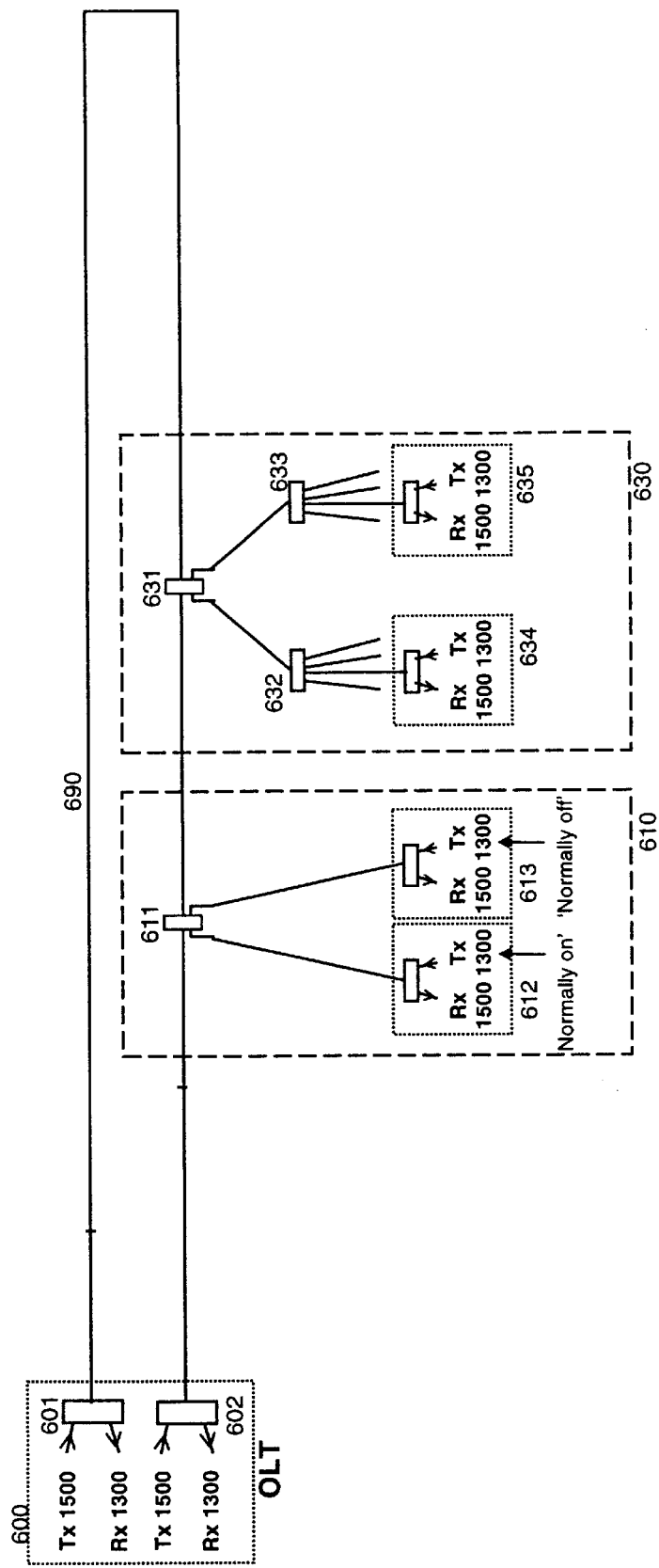
FIG. 6 shows a fifth example of a PON in accordance with the present invention showing alternative drop-point and protection arrangements.

Turning now to FIG. 6 a still further arrangement is shown comprising an OLT 600 comprising two transceivers 601, 602 connected via a fibre feeder ring 690 to a pair of drop point arrangements 610, 630. Both transceivers operate continuously carrying the same data.

Arrangement 610 comprises a wavelength flat ring splitter/combiner 611 connected both to the ring and in opposite directions to two ONUs 612, 613 each arranged to transmit on 1300 nm and receive on 1550 nm. This arrangement provides protection both against single point failure in the fibre ring 690 and in the distribution fibre connecting the ONUs to the ring splitter/combiner 611. In normal operation it is to be expected that one of the pair of ONUs 612 would be on whilst the other 613 would in normal operation be switched off, coming into operation only in the event of failure on the part of ONU 612 or in the fibre network connecting it to the ring splitter/combiner 611.

A final drop point arrangement 630 comprises a bidirectional flat ring splitter/combiner 631 connected both to the ring 690 and in opposite directions to two final drop splitter/combiners 632, 633. Each of these final drop splitter/combiners serves a number of ONUs 634, 635 each of which transmits on 1300 nm and receives on 1500 nm. In the case where each subscriber has a single ONU then no protection is provided in this arrangement. However, where a subscriber has one ONU connected to a first final drop splitter/combiner 632 and second ONU connected to a second final drop splitter/combiner 633, then protection is provided both in the distribution network from the ring splitter/combiner 631 to the ONUs, and against single point failure in the fibre ring 690.

Figure 7:
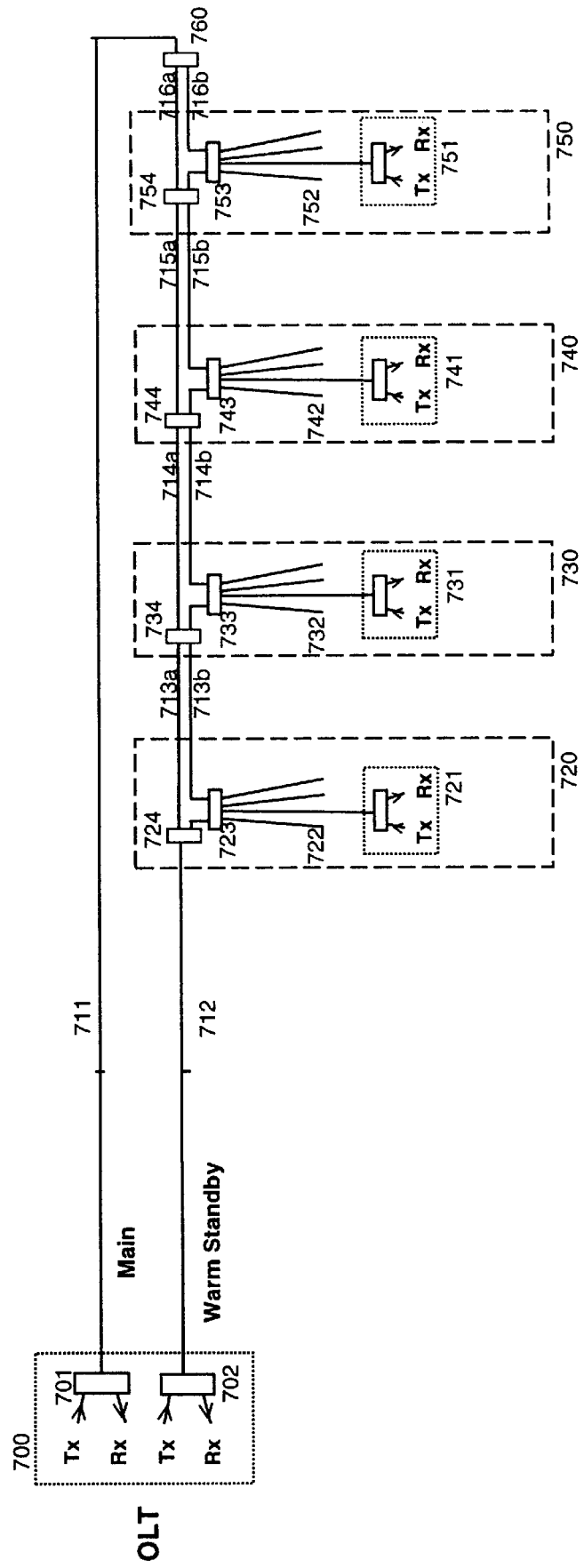
FIG. 7 shows a sixth example of a PON in accordance with the present invention.

Turning now to FIG. 7, a still further arrangement is shown comprising an OLT 700 comprising two transceivers 701, 702 connected via a fibre feeder ring 790 to four drop point arrangements 720, 730, 740, 750, one transceiver 701 is arranged to operate in main mode, whilst the other 702 is arranged to operate in warm standby mode. The drop point arrangements and splitter/combiner 760 are connected to the OLT by fibre distribution lines 711, 712 and each other by pairs of fibre distribution lines 713a–716a, 713b–716b, to form a ring between the two transceivers. As before each drop point arrangement 720, 730, 740, 750 is linked to a number of subscriber ONUs 721, 731, 741, 751 each comprising an optical transceiver respectively by means of a fan-out arrangement of final drop fibre links 722, 732, 742, 752 respectively similar to the arrangement shown in FIG. 2. This arrangement differs from that of FIG. 2 however, in that the drop point splitter arrangement comprises an arrangement of two optical splitters/combiners: one ring splitter/combiner and one final drop/ring splitter/combiner.

Signals are transmitted from the main transceiver 701 over the fibre distribution network 711 to an initial splitter/combiner 760. The splitter/combiner 760 is arranged such that the majority of the signal received is conveyed via optical medium 716a to ring splitter/combiner 754 from which it is conveyed via fibres 715a, 715b to the second drop point 740 where similar procedure takes place. A small proportion of the signal received at ring splitter/combiner 760 is conveyed via optical medium 716b to the final drop/ring splitter/combiner 753 which once again divides the signal, in this case typically equally, between the final drop lines 752 to the subscriber ONUs 751.

Drop point arrangements 730, 720 are similarly arranged to receive transmissions from drop point arrangements 740, 730 respectively. Drop point arrangement 720 differs in that whilst it receives transmissions on fibre 713a from drop point arrangement 730 at the ring splitter/combiner 724 all of this signal is conveyed via fibre length 712 to warm standby transceiver 702 at the OLT 700.

In this arrangement it is to be noted that the drop point arrangements at each end of the sequence of drop point arrangements differ from those not at the ends.

Considering now traffic in the reverse direction from ONU to OLT, a transceiver for example 731 emits a signal which is conveyed via the final drop feeder lines 732 to final drop/ring splitter/combiner 733 of the drop point arrangement which splits the signal, typically equally, and conveys the resulting signals by means of optical media to ring splitter/combiners 734, 744. The signal so conveyed to splitter/combiner 734 is then split, the majority of the signal being directed via optical medium 713a via ring splitter/combiner 724 and optical medium 712 to OLT transceiver 702. Correspondingly the signal conveyed to splitter/combiner 744 is split, the majority of the signal being directed along optical medium 715a and thereafter via splitter 754 which directs the majority of the signal along optical medium 716a to splitter 760 which in turn directs the signal via optical medium 711 to the OLT main transceiver 701.

As before, in normal operation only the main transceiver 701 is used to transmit and receive signals between the OLT and outlying ONUs. In the event of a fault arising in the distribution network or main transceiver 701, standby transceiver 702 comes into operation to transmit to the ONUs and process signals received from them.

An advantage of this arrangement over the arrangements above is that signals passing around the ring through any given drop point arrangement pass through only a single splitter/combiner at any given drop point. Attenuation losses associated with signals passing through drop point arrangements are consequently lower than in the previous arrangements, which in turn enables a larger number of drop point arrangements to be placed in a single ring-protected PON arrangement.

Through losses in each of the ring splitters/combiners of drop point arrangements 720, 730, 740, 750, using known technology, would be typically in the order of 3 dB, drop losses typically also 3 dB, and losses in the final drop/ring splitter/combiner typically 6 dB. The overall transmission power loss between the OLT and each ONU would typically be in the order of 10–16 dB.

In the case of a drop point 720 located at one end of the loop, the through splitter/combiner need have only a single port facing the section 712 of the loop towards the OLT 700. Such a splitter/combiner may have even lower through loses, typically in the order of 1 dB. A corresponding stand-alone splitter/combiner 760 will be required at the other end of the loop arrangement to combine signals from the pair of loop fibre sections 716a–b connected to the drop point 750 located at the other end of the loop.

A further benefit of a ring-protected PON is that it allows network operators to provision a network by stages. A single ring may be installed to support a sparse population of subscribers/ONU's and, when a time is reached when more subscribers require service than the ring can support, the ring may be split at a chosen point, and each fibre end so formed reconnected via new fibre lines back to an additional transceiver at an OLT. Where the additional OLT transceivers are collocated with those originally installed, the resulting network takes the form of a pair of ring-protected PONs; where the additional OLT transceivers are not collocated with the original OLT transceivers, two dual-homed distribution networks are formed.

Furthermore, this operation has the advantage that, in cases where protection is provided by the ring arrangement, the operation may be performed while the distribution network is in service without materially affecting its operation or interrupting service provision to the subscribers (except in the event of some additional failures occurring in the network).

In summary, an arrangement of distributed splitter/combiner arrangements around a PON ring, each arrangement serving one or more customers in a bus-type configuration is provided. The operation of the PON over a fibre feeder ring, using a specially configured optical ring splitter which connects the ring to the distribution network, while allowing normal operation of the ring and full protection for the complete PON.

Each optical ring splitter/combiner arrangement is typically formed from a pair of back-to-back splitters, in a novel configuration. It allows full transparency of the feeder ring to be maintained whilst allowing the PON signals to be dropped/inserted for distribution to the customer drops. In addition, it allows protected PON signals on the ring to be passed on into the PON distribution network and down to the drop splitter serving one or more customers (with partial protection) or directly into customer premises (giving full protection).

The technique allows the feeder ring to be broken for repair, for new customers to be added (as and when required), and for normal PON protocols to be used (e.g. TDMA). It allows differing levels of protection, (e.g. OLT/feeders only, plus distribution, plus drops, plus ONU if required). The configuration also allows all fibering to be spatially separated and can be easily dual-homed, if required. A feature of the invention is that it allows for splitters to be added to the ring simply and cheaply where and when required, which helps to lower the initial installation costs.

The invention is also applicable to applications not utilising WDM. In such cases double (or greater) the amount of fibre and number of splitters may be required.

Any range or device value given herein may be extended or altered without losing the effect sought, as will be apparent to the skilled person for an understanding of the teachings herein.

What is claimed is:

1. An optical splitter/combiner arrangement for a passive optical network comprising two through optical ports and at least one drop optical port, and wherein a first optical path is provided between said through ports and a second optical path is provided between one of said through ports and one of said drop optical ports, wherein losses associated with said first optical path are lower than losses associated with said second optical path.

2. An optical splitter/combiner arrangement according to claim 1 wherein a relatively high loss path is provided between one of said through ports and each of said drop ports.

3. An optical splitter/combiner arrangement according to claim 1 wherein a relatively high loss path is provided between each of said through ports and one of said drop ports.

4. An optical splitter/combiner arrangement according to claim 1 wherein a relatively high loss path is provided between each of said through ports and each of said drop ports.

5. An optical splitter/combiner arrangement according to claim 1 arranged to split signals received on one of said drop ports between each of said through ports.

6. An optical splitter/combiner arrangement according to claim 1 comprising first and second asymmetrical splitter/combiners optically connected to each other to form a low loss optical path and each optically connected to a common one of said through ports, and each optically connected to a third splitter/combiner optically connected to said at least one drop port.

7. An optical splitter/combiner arrangement according to claim 1 comprising an asymmetrical splitter/combiner optically connected to each of said through ports and providing a low loss path between said ports, and each optically connected to a third splitter/combiner optically connected to said at least one drop ports to form a relatively higher loss path between said through ports and said drop ports.

8. An optical splitter/combiner arrangement according to claim 1 comprising only one optical splitter/combiner.

9. An optical splitter/combiner arrangement according to claim 1 comprising a WDM splitter/combiner.

10. A passive optical network comprising a splitter/combiner arrangement according to claim 1.

11. A passive optical network according to claim 10 wherein each of said two through ports of said splitter/combiner arrangement is optically connected via a linear optical network to a distinct OLT transceiver.

12. A passive optical network according to claim 11 wherein said splitter/combiner arrangement is arranged to convey signals between each of said distinct OLT transceivers and said at least one drop ports whereby to provide protection against single point failure in said linear network.

13. A passive optical network according to claim 11 wherein said distinct OLT transceivers are physically separated whereby to provide dual homing.

14. A passive optical network comprising a plurality of splitter/combiner arrangements according to claim 1 wherein said splitter/combiner arrangements are configured to provide a plurality of distinct degrees of protection against faults in the network.

15. A passive optical network comprising:
   a plurality of optical splitter/combiner arrangements according to claim 1;
   wherein said through ports of said plurality of splitters/combiners are concatenated to form a linear arrangement having two end through ports;
   whereby optical signals may be transmitted between said end through ports by means of said linear arrangement; and
   wherein signals may be transmitted between at least one of said end through ports and one of said drop ports by means of said linear arrangement.

16. A method of adding a drop point to a PON comprising at least one drop point optically connected by a linear arrangement of fibre lines to first and second OLT transceivers, comprising the steps of:
   severing one of said fibre lines to expose two fibre ends;
   providing a drop point arrangement according to claim 1;
   coupling said exposed fibre ends to said two through optical ports of said drop point arrangement.

17. A method according to claim 16 performed while the PON is carrying traffic.

18. An optical splitter/combiner arrangement comprising:
   first, second and third optical ports; and
   at least one drop optical port;
   and wherein a relatively low loss path is provided between said first and second ports, a relatively high loss path is provided between said first optical port and said at least one drop optical ports, and a relatively high loss path is provided between said third optical port and said at least one drop optical port.

19. An optical splitter/combiner arrangement according to claim 18 additionally comprising:

a fourth optical port;

and wherein a relatively high loss path is provided between said second and fourth optical ports and a relatively high loss path is provided between said fourth port and said at least one drop optical ports.

20. A passive optical network comprising a splitter/combiner arrangement according to claim 18.

21. A passive optical network according to claim 20 wherein each of said first optical port of said splitter/combiner arrangement is connected via a linear optical network to a first OLT transceiver, and said second and third optical ports of said splitter/combiner arrangement are each optically connected via a linear optical network to a second OLT transceiver.

22. A passive optical network according to claim 21 wherein said splitter/combiner arrangement is arranged to convey signals between each of said first and second OLT transceivers and said at least one drop port whereby to provide protection against single point failure in said linear optical networks.

23. A method of upgrading a PON comprising a plurality of drop points optically connected by a linear arrangement of fibre lines to first and second OLT transceivers, comprising the steps of:

severing one of said fibre lines to expose two fibre ends;

providing third and fourth OLT transceivers;

providing optical fibre lines;

coupling said exposed fibre ends via said optical fibre lines to said third and fourth OLT transceivers.

24. A method according to claim 23 performed while the PON is carrying traffic.

25. A method of providing a PON comprising:

providing a pair of transceivers, providing a plurality of optical fibre lengths;

providing at least one splitter/combiner drop point arrangement;

connecting said fibre lengths and said splitter/combiner drop point arrangement to form a linear network connecting said at least one splitter/combiner drop point arrangement and connecting said transceivers to opposite ends of said linear network;

and wherein one transmitter and one receiver of said pair of transceivers operates in main mode and another transmitter and another receiver of said pair of transceivers operates in warm standby mode;

and arranged to provide single point failure protection in the network between said transceivers.

* * * * *